US012632149B1

(12) United States Patent
Li et al.

(10) Patent No.: US 12,632,149 B1
(45) Date of Patent: May 19, 2026

(54) ULTRASONIC FINGERPRINT SENSOR CONFIGURATION BASED ON A-LINE DATA

(71) Applicant: QUALCOMM Incorporated, San Diego, CA (US)

(72) Inventors: Dingyi Li, San Jose, CA (US); Kwokleung Chan, Sunnyvale, CA (US); I-Ling Su, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/193,759

(22) Filed: Apr. 29, 2025

(51) Int. Cl.
*G06F 3/043* (2006.01)
*G06V 40/13* (2022.01)

(52) U.S. Cl.
CPC .......... *G06F 3/043* (2013.01); *G06V 40/1306* (2022.01)

(58) Field of Classification Search
CPC ........................... G06F 3/043; G06V 40/1306
USPC ......................................................... 345/177
See application file for complete search history.

(56) References Cited

U.S. PATENT DOCUMENTS

| | | | | |
|---|---|---|---|---|
| 2017/0108961 A1* | 4/2017 | Thorstenson | ......... | G06F 1/1626 |
| 2017/0257492 A1* | 9/2017 | Levesque | ........... | G06F 3/04883 |
| 2020/0401781 A1* | 12/2020 | Haddad | .............. | G06V 40/1318 |
| 2021/0117519 A1* | 4/2021 | Yoon | .................. | G06V 40/1306 |
| 2024/0346120 A1* | 10/2024 | Khuri-Yakub | .......... | G06F 21/32 |

* cited by examiner

*Primary Examiner* — Jonathan M Blancha
(74) *Attorney, Agent, or Firm* — QUALCOMM Incorporated

(57) ABSTRACT

Systems and methods for ultrasonic fingerprint sensor configuration based on A-line data are disclosed. In an example, an ultrasonic fingerprint sensor system may be controlled to obtain current A-line data corresponding to a screen protector on an outside surface of an apparatus, the current A-line data comprising sensor data corresponding to reflections of ultrasonic waves from the screen protector as detected by an ultrasonic receiver. At least one configuration parameter associated with the current A-line data corresponding to the screen protector may be obtained. The configuration parameter may be tuned to configure the ultrasonic fingerprint sensor system to capture fingerprint image data through the screen protector. The ultrasonic fingerprint sensor system may be configured based on the at least one configuration parameter associated with the current A-line data corresponding to the screen protector.

20 Claims, 11 Drawing Sheets

200

360

362 — Trigger A-line scan

364 — Contaminant check pass?

No

Yes

366 — Obtain A-line data corresponding to a screen protector

368 — Obtain configuration parameters for fingerprint sensor system from a dictionary based on the A-line data 370 — Configure fingerprint sensor system based on the configuration parameters 372 — Optionally re-enroll user 374 — End

500

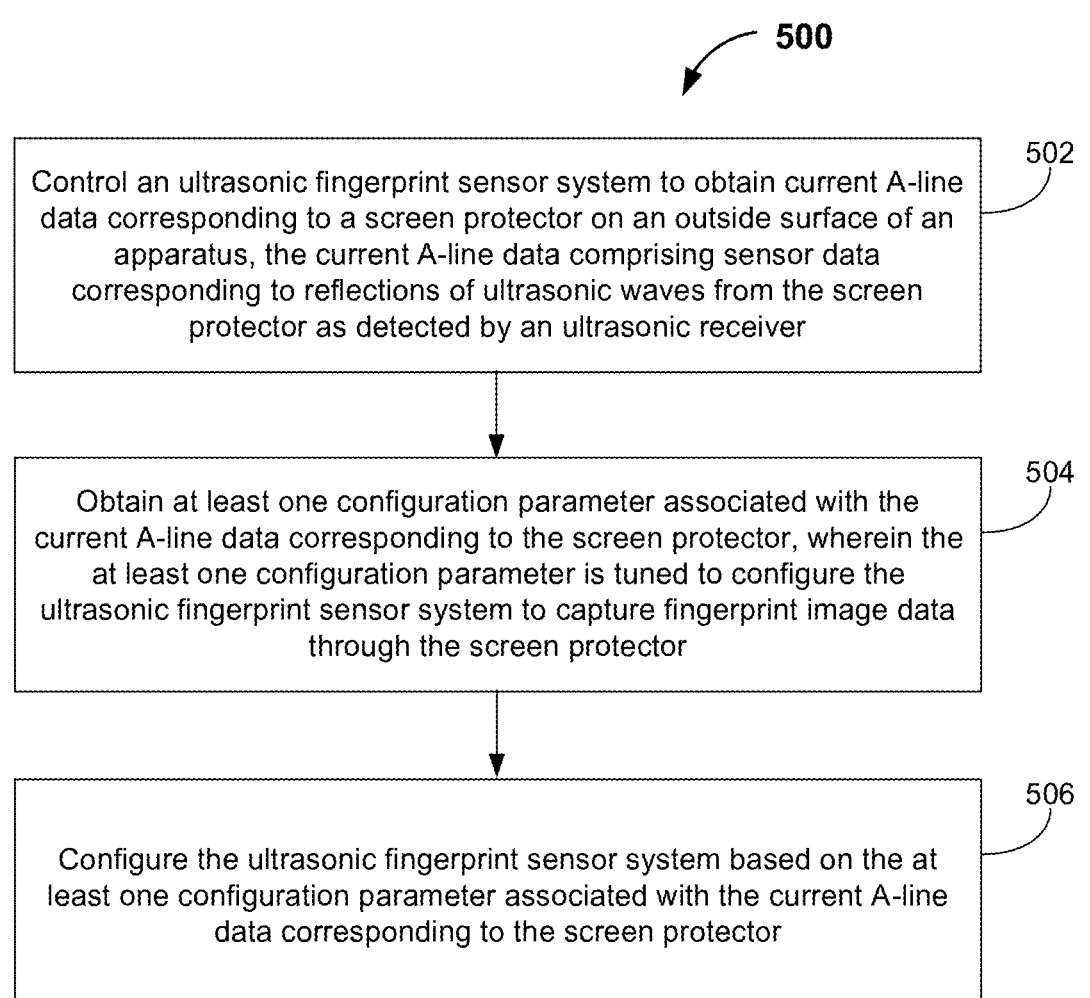

502

Control an ultrasonic fingerprint sensor system to obtain current A-line data corresponding to a screen protector on an outside surface of an apparatus, the current A-line data comprising sensor data corresponding to reflections of ultrasonic waves from the screen protector as detected by an ultrasonic receiver

504

Obtain at least one configuration parameter associated with the current A-line data corresponding to the screen protector, wherein the at least one configuration parameter is tuned to configure the ultrasonic fingerprint sensor system to capture fingerprint image data through the screen protector

506

Configure the ultrasonic fingerprint sensor system based on the at least one configuration parameter associated with the current A-line data corresponding to the screen protector

*Figure 5*

ULTRASONIC FINGERPRINT SENSOR CONFIGURATION BASED ON A-LINE DATA

TECHNICAL FIELD

This disclosure relates generally to ultrasonic fingerprint sensor systems and relates more specifically to configuring ultrasonic fingerprint sensor systems.

DESCRIPTION OF THE RELATED TECHNOLOGY

Biometric authentication can be an important feature for controlling access to devices, etc. Many existing products include some type of biometric authentication, including but not limited to fingerprint-based authentication. Although some existing fingerprint-based authentication methods and devices can provide satisfactory performance, improved methods and devices would be desirable.

SUMMARY

The systems, methods and devices of the disclosure each have several innovative aspects, no single one of which is solely responsible for the desirable attributes disclosed herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an apparatus. The apparatus also includes an ultrasonic fingerprint sensor system including an ultrasonic transmitter and an ultrasonic receiver. The apparatus also includes a control system configured for electrical communication with the ultrasonic fingerprint sensor system, the control system being further configured to: control the ultrasonic fingerprint sensor system to obtain current A-line data corresponding to a screen protector on an outside surface of the apparatus, the current A-line data may include sensor data corresponding to reflections of ultrasonic waves from the screen protector as detected by the ultrasonic receiver; obtain at least one configuration parameter associated with the current A-line data corresponding to the screen protector, where the at least one configuration parameter is tuned to configure the ultrasonic fingerprint sensor system to capture fingerprint image data through the screen protector; and configure the ultrasonic fingerprint sensor system based on the at least one configuration parameter associated with the current A-line data corresponding to the screen protector. Other embodiments of this aspect include corresponding computer systems, apparatus, and computer programs recorded on one or more computer storage devices, each configured to perform the actions of the methods.

Implementations may include one or more of the following features. The apparatus where the control system is configured to control the ultrasonic fingerprint sensor system to obtain the current A-line data upon detecting an absence of a user digit on the outside surface of the apparatus. The control system is configured to control the ultrasonic fingerprint sensor system to obtain the current A-line data at periodic time intervals. Configuring the ultrasonic fingerprint sensor system modifies at least one of a transmission parameter of the ultrasonic transmitter or a reception parameter of the ultrasonic receiver. The control system is configured to obtain the at least one configuration parameter associated with the current A-line data from a memory of the apparatus. The at least one configuration parameter is obtained from the memory upon determining a match between the current A-line data and stored A-line data stored in the memory, where the stored A-line data corresponds to a screen protector previously detected on the outside surface of the apparatus. The control system is configured to obtain the at least one configuration parameter associated with the current A-line data from a dictionary stored in a memory of the apparatus. The dictionary maps respective A-line data associated with a plurality of screen protectors to one or more corresponding configuration parameters. The dictionary includes a plurality of bins corresponding to different temperature ranges, and where each bin includes mappings between A-line data associated with a plurality of screen protectors and one or more corresponding configuration parameters calibrated for a temperature range associated with the bin. Upon configuring the ultrasonic fingerprint sensor system based on the at least one configuration parameter, the control system is further configured to provide a graphical user interface through a display screen of the apparatus, where the graphical user interface provides one or more options to initiate an enrollment process. Implementations of the described techniques may include hardware, a method or process, or computer software on a computer-accessible medium.

One general aspect includes a method. The method also includes controlling, by a control system, an ultrasonic fingerprint sensor system to obtain current A-line data corresponding to a screen protector on an outside surface of an apparatus, the current A-line data may include sensor data corresponding to reflections of ultrasonic waves from the screen protector as detected by an ultrasonic receiver. The method also includes obtaining, by the control system, at least one configuration parameter associated with the current A-line data corresponding to the screen protector, where the at least one configuration parameter is tuned to configure the ultrasonic fingerprint sensor system to capture fingerprint image data through the screen protector. The method also includes configuring, by the control system, the ultrasonic fingerprint sensor system based on the at least one configuration parameter associated with the current A-line data corresponding to the screen protector. Other embodiments of this aspect include corresponding computer systems, apparatus, and computer programs recorded on one or more computer storage devices, each configured to perform the actions of the methods.

One general aspect includes one or more non-transitory media having instructions stored thereon for controlling a device to perform a method. The one or more non-transitory media also includes controlling, by a control system, an ultrasonic fingerprint sensor system to obtain current A-line data corresponding to a screen protector on an outside surface of the device, the current A-line data may include sensor data corresponding to reflections of ultrasonic waves from the screen protector as detected by an ultrasonic receiver. The media also includes determining, by the control system, a screen protector change based at least in part on a mismatch between the current A-line data corresponding to the screen protector on the outside surface of the apparatus and stored A-line data corresponding to a screen protector previously detected on the outside surface of the apparatus. The media also includes storing, by the control system, the current A-line data corresponding to the screen protector and at least one configuration parameter associated with the current A-line data corresponding to the screen protector, where the at least one configuration parameter is tuned to configure the ultrasonic fingerprint sensor system to capture fingerprint image data through the screen protector. The media also includes configuring, by the control system, the ultrasonic fingerprint sensor system based on the at least one configuration parameter associated with the current A-line data corresponding to the screen protector. Other embodiments of this aspect include corresponding computer systems, apparatus, and computer programs recorded on one or more computer storage devices, each configured to perform the actions of the methods.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 5 is a flow diagram that presents examples of operations according to some disclosed methods.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Figure 1:
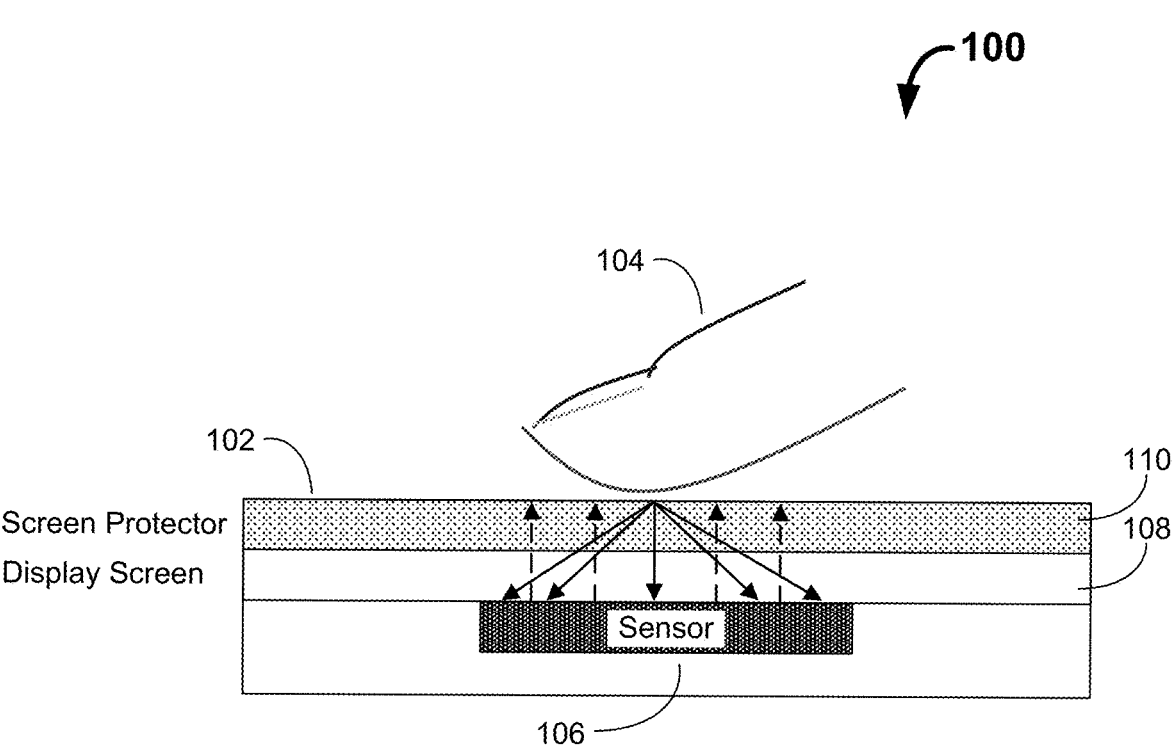
FIG. 1 is an example cross-sectional view of an apparatus.

FIG. 1 is an example cross-sectional view of an apparatus 102. In this example, a finger 104 is shown interacting with a fingerprint sensor system 106 of the apparatus 102 .... In this example, the apparatus 102 includes a display screen 108 and a screen protector (or protective film) 110 that is applied to the display screen 108. According to this example, the display screen 108 resides between the fingerprint sensor system 106 and the screen protector 110. The screen protector 110 is an additional sheet of material, such as polyurethane or glass, that can be attached (or applied) to protect the display screen 108 against physical damage. This transparent layer typically allows a user to view and interact with the display screen 108 while shielding the display screen 108 from scratches or other harm. However, the screen protector 110 may significantly impact the accuracy of fingerprint-based authentication by creating a barrier between the finger 104 and the fingerprint sensor system 106. In general, the fingerprint sensor system 106 may operate by transmitting ultrasonic pulses of inaudible sound waves against the finger 104, then capturing the echo of these waves as they reflect off a fingerprint corresponding to the finger 104. The captured reflections may be used to create a detailed three-dimensional (3D) image of the fingerprint, including ridge lines and sweat pores, by analyzing how the sound waves penetrate through the outer layer of skin and reflect back from the dermis underneath. In this example, the screen protector 110 introduces an additional medium through which these ultrasonic waves must travel. This extra layer can absorb, scatter, or distort the ultrasonic pulses, reducing the clarity and detail of fingerprint image data captured by the fingerprint sensor system 106. The screen protector thus creates a physical barrier that may make it difficult for the fingerprint sensor system 106 to detect unique fingerprint variations. As a result, 3D renderings of fingerprints may become less accurate, potentially leading to an increase in failed authentication attempts.

Various embodiments described herein may use "A-line data" to recognize the screen protector 110 applied to the display screen 108 of the apparatus 102, and to optimally configure the fingerprint sensor system 106 to capture fingerprint image data through the screen protector 110. A-line data is fingerprint sensor data corresponding to reflections of ultrasonic waves from a target object that are detected by a single receiver pixel, or by a cluster of adjacent receiver pixels. For example, A-line data associated with the screen protector 110 may be captured by the fingerprint sensor system 106. Under conventional practice, the ultrasonic fingerprint sensor 106 may be configured to sample signals over a narrow time interval (e.g., approximately 100 nanoseconds). To capture A-line data, the fingerprint sensor system 106 may be configured to sample signals over a longer time interval (e.g., tens of microseconds) than conventional practice, which typically uses a narrow time interval (e.g., approximately 100 nanoseconds) to sample fingerprint image data. Based on the A-line data captured from the screen protector 110, one or more configuration parameters for configuring the fingerprint sensor system 106 may be determined and applied. For example, the configuration parameters may be determined based on a dictionary that maps A-line data corresponding to different screen protectors to respective configuration parameters tuned (or optimized) to configure the fingerprint sensor system 106 to process fingerprint image data through the different screen protectors.

Particular aspects of the subject matter described in this disclosure may be implemented to realize one or more of the following potential advantages. For example, some aspects of the subject matter may be implemented to recognize a screen protector that has been applied to a display screen of an electronic device based on A-line data. Based on the A-line data, configuration parameters that have been tuned (or optimized) for capturing fingerprint image data through the screen protector may be obtained and used to configure a fingerprint sensor system of the electronic device. The tuned configuration parameters may be determined based on properties associated with the screen protector, such as thickness, material composition, and optical properties. Accordingly, aspects of the subject matter may be implemented to improve fingerprint recognition accuracy through screen protectors, thereby solving a common problem where screen protectors interfere with fingerprint reader reliability. As a result, user experience is improved through reliable fingerprint authentication regardless of the screen protector being used. Further, fingerprint sensor systems of the electronic device may be seamlessly reconfigured in response to changes in screen protectors.

Figure 2:
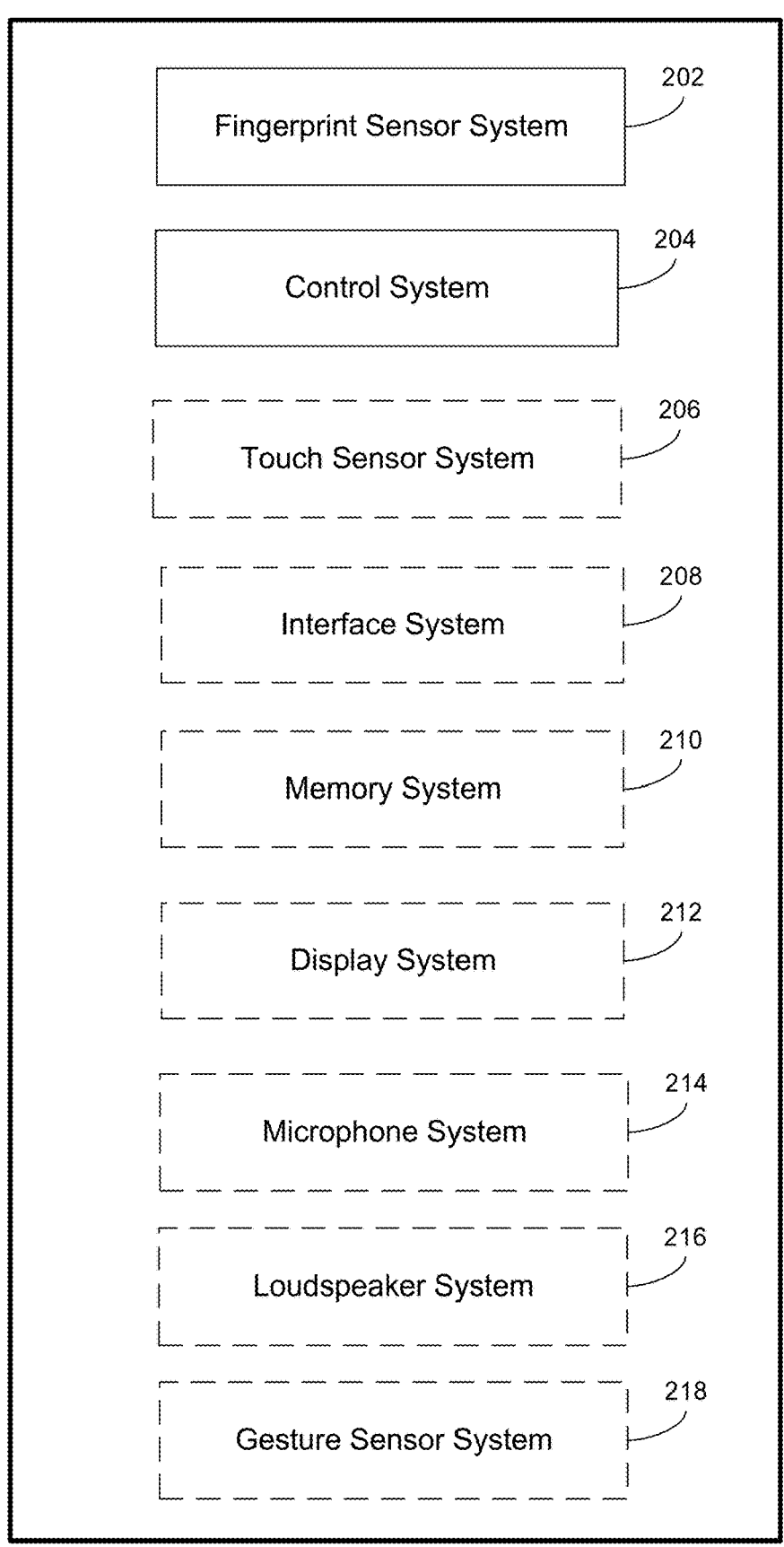
FIG. 2 is a block diagram that shows example components of an apparatus according to some disclosed implementations.

FIG. 2 is a block diagram that shows example components of an apparatus according to some disclosed implementations. In this example, the apparatus 200 includes a fingerprint sensor system 202 and a control system 204. Some implementations may include a touch sensor system 206, an interface system 208, a memory system 210, a display system 212, a microphone system 214, a loudspeaker system 216, a gesture sensor system 218, or combinations thereof.

In this example, the fingerprint sensor system 202 is, or includes, an ultrasonic fingerprint sensor system. In some implementations the fingerprint sensor system 202 also may include another type of fingerprint sensor, such as an optical fingerprint sensor, a capacitive fingerprint sensor, a thermal fingerprint sensor, etc. In some examples, the ultrasonic fingerprint sensor system may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 202 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 202 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 202 may sometimes be referred to herein as "sensor data", "fingerprint sensor data," "fingerprint image data," etc., whether or not the received data corresponds to an actual digit or another object (e.g., a screen protector) from which the fingerprint sensor system 202 has received data. Such data will generally be received from the fingerprint sensor system in the form of electrical signals. Accordingly, without additional processing such image data would not necessarily be perceivable by a human being as an image. The word "finger" as used herein may correspond to any digit, including a thumb.

Accordingly, a thumbprint is a type of fingerprint.

The optional touch sensor system 206 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 206 may extend over most or all of a display portion of the display system 212.

In some examples, the interface system 208 may include a wireless interface system. In some implementations, the interface system 208 may include a user interface system, one or more network interfaces, one or more interfaces between the control system 204 and the fingerprint sensor system 202, one or more interfaces between the control system 204 and the touch sensor system 206, one or more interfaces between the control system 204 and the memory system 210, one or more interfaces between the control system 204 and the display system 212, one or more interfaces between the control system 204 and the microphone system 214, one or more interfaces between the control system 204 and the loudspeaker system 216, one or more interfaces between the control system 204 and the gesture sensor system 218 and/or one or more interfaces between the control system 204 and one or more external device interfaces (e.g., ports or applications processors).

The interface system 208 may be configured to provide communication (which may include wired or wireless communication, electrical communication, radio communication, etc.) between components of the apparatus 200. In some such examples, the interface system 208 may be configured to provide communication between the control system 204 and the fingerprint sensor system 202. According to some such examples, the interface system 208 may couple at least a portion of the control system 204 to the fingerprint sensor system 202 and the interface system 208 may couple at least a portion of the control system 204 to the touch sensor system 206, e.g., via electrically conducting material (e.g., via conductive metal wires or traces). According to some examples, the interface system 208 may be configured to provide communication between the apparatus 200 and other devices and/or human beings. In some such examples, the display system 212, the microphone system 214, the loudspeaker system 216, the gesture sensor system 218, or combinations thereof may be considered to be components of the interface system 208, even though these components are shown as separate blocks in FIG. 2. In some examples, the interface system 208 may include one or more user interfaces, haptic feedback devices, etc. The interface system 208 may, in some examples, include one or more network interfaces and/or one or more external device interfaces (such as one or more universal serial bus (USB) interfaces or a serial peripheral interface (SPI)).

The control system 204 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 204 also may include one or more memory devices, such as one or more random access memory (RAM) devices, read-only memory (ROM) devices, etc. In this example, the control system 204 is configured for communication with, and for controlling, the fingerprint sensor system 202. In implementations wherein the apparatus includes a touch sensor system 206, the control system 204 may be configured for communication with, and for controlling, the touch sensor system 206. In implementations wherein the apparatus includes a memory system 210 that is separate from the control system 204, the control system 204 also may be configured for communication with the memory system 210. In implementations wherein the apparatus includes a display system 212, the control system 204 may be configured for communication with, and for controlling, the display system 212. In implementations wherein the apparatus includes a microphone system 214, the control system 204 may be configured for communication with, and for controlling, the microphone system 214. In implementations wherein the apparatus includes a loudspeaker system 216, the control system 204 may be configured for communication with, and for controlling, the loudspeaker system 216. According to some examples, the control system 204 may include one or more dedicated components that are configured for controlling the fingerprint sensor system 202, the touch sensor system 206, the memory system 210, the display system 212, the microphone system 214 and/or the loudspeaker system 216.

Accordingly, some examples of the apparatus 200 may include dedicated components that are configured for controlling at least a portion of the fingerprint sensor system 202, for processing fingerprint image data received from the fingerprint sensor system 202, or combinations thereof. Although the control system 204 and the fingerprint sensor system 202 are shown as separate components in FIG. 2, in some implementations at least a portion of the control system 204 and at least a portion of the fingerprint sensor system 202 may be co-located. For example, in some implementations one or more components of the fingerprint sensor system 202 may reside on an integrated circuit or "chip" of the control system 204. According to some implementations, functionality of the control system 204 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the memory system 210 may include one or more memory devices, such as one or more RAM devices, ROM devices, etc. In some implementations, the memory system 210 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 210 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 200 includes a display system 212, which may include one or more displays. In some examples, the display system 212 may be, or may include, a light-emitting diode (LED) display, such as an organic light-emitting diode (OLED) display. In some such examples, the display system 212 may include layers, which may be referred to collectively as a "display stack."

In some implementations, the apparatus 200 may include a microphone system 214. The microphone system 214 may include one or more microphones, one or more types of microphones, or combinations thereof.

According to some implementations, the apparatus 200 may include a loudspeaker system 216. The loudspeaker system 216 may include one or more loudspeakers, one or more types of loudspeakers, or combinations thereof.

In some implementations, the apparatus 200 may include a gesture sensor system 218. The gesture sensor system 218 may be, or may include, an ultrasonic gesture sensor system, an optical gesture sensor system or any other suitable type of gesture sensor system.

The apparatus 200 may be used in a variety of different contexts, some examples of which are disclosed herein. For example, in some implementations, a mobile device may include at least a portion of the apparatus 200. In some implementations, a wearable device may include at least a portion of the apparatus 200. The wearable device may, for example, be a bracelet, a watch, an armband, a wristband, a ring, a headband, an earbud or a patch. In some implementations, the control system 204 may reside in more than one device. For example, a portion of the control system 204 may reside in a wearable device and another portion of the control system 204 may reside in another device, such as a mobile device (e.g., a smartphone). The interface system 208 also may, in some such examples, reside in more than one device.

According to some implementations, the control system 204 may be configured to control the fingerprint sensor system 202 to scan a screen protector applied to a surface (or cover glass) of the apparatus 200. The scan may be triggered when a user digit is not present on the surface of the apparatus 200, at periodic time intervals (e.g., hourly, daily, etc.), or when a user unlocks the apparatus 200, for example.

A screen protector may be a protective layer, film, or cover designed to shield the surface of the apparatus 200. Screen protectors may be made from materials such as tempered glass, plastic films, or liquid coatings, and they may come in various configurations based on their material properties and intended functionality. These include high-definition (HD) protectors for clarity, matte finishes to reduce glare, privacy protectors to limit viewing angles, and anti-blue light protectors to reduce eye strain. In configurations where the protective layer does not cover a display but instead protects other surfaces of a device (such as the back panel or fingerprint sensor area), ultrasonic waves used in fingerprint sensor systems must still travel through the protective layer to capture data. For example, ultrasonic fingerprint sensors may be deployed on the back of devices or integrated into specific areas separate from the display. In such cases, the protective layer can vary in thickness and material composition, impacting the acoustic transmission and reflection of ultrasonic waves.

According to some implementations, the control system 204 may detect when a screen protector that was applied to the surface of the apparatus 200 is removed or replaced. In such implementations, the control system 204 may be configured to obtain, from the fingerprint sensor system 202, current A-line data corresponding to reflections of ultrasonic waves from a screen protector currently applied to the surface of the apparatus 200. The control system 204 may obtain, from the memory system 210, stored A-line data corresponding to a screen protector that was previously detected on the surface of the device.

In such implementations, the current A-line data and the stored A-line data may be compared to determine whether the screen protector previously identified for the apparatus 200 is the same as or different from the screen protector currently applied to the surface of the apparatus 200. In some implementations, if the current A-line data matches the stored A-line data, the control system 204 may determine that the currently applied screen protector is the same as the screen protector that was previously detected for the apparatus 200. In such implementations, configuration parameters associated with the screen protector previously detected for the apparatus 200 may be obtained from the memory system 210 and reused to configure the fingerprint sensor system 202. For example, the configuration parameters may correspond to one or more transmission (Tx) and/or reception (Rx) parameters associated with the fingerprint sensor system 202. Some examples of Tx parameters that may be reconfigured include transmit frequency, transmit voltage amplitude, pulse duration, pulse repetition rate, and beamforming settings (such as the number and arrangement of active transmitting elements). Some examples of Rx parameters that may be reconfigured include receiver gain (sensitivity), sampling rate, range gate delays (time windows for capturing echoes), and filtering or equalization settings applied to the received signals.

In contrast, if the current A-line data does not match the stored A-line data, the control system 204 may determine that the currently applied screen protector is different from the screen protector that was previously detected for the apparatus 200. In such implementations, configuration parameters associated with the currently applied screen protector may be obtained and used to configure the fingerprint sensor system 202. For example, in some implementations, configuration parameters associated with the currently applied screen protector may be obtained from a dictionary (or other data structure) stored in the memory system 210. The dictionary may map A-line data associated with various screen protectors to corresponding configuration parameters tuned (or optimized) for the screen protectors. As a result, based on the dictionary, the control system 202 may recognize (or identify) any screen protector that is applied to the surface of the apparatus 200 based on its A-line data, obtain configuration parameters that are specifically tuned for the screen protector, and customize a configuration of the fingerprint sensor system 202 to best operate in conjunction with the screen protector.

Figure 3A:
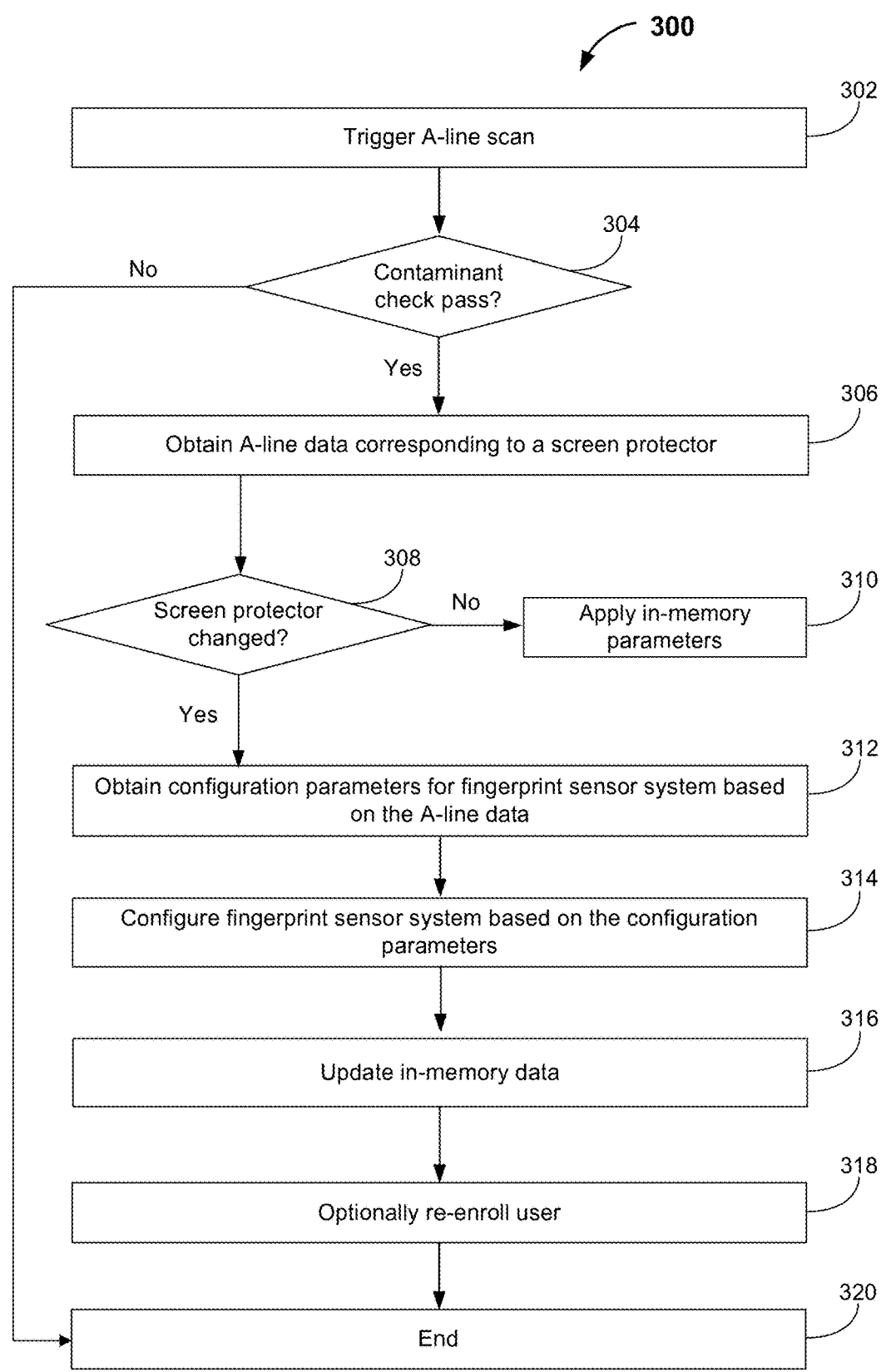
FIG. 3A is a flow diagram that presents examples of operations according to some disclosed methods.

FIG. 3A is a flow diagram that presents examples of operations according to some disclosed methods. The blocks of FIG. 3A may be performed by an apparatus that includes at least a fingerprint sensor system and a control system. The blocks of FIG. 3A may, for example, be performed by the apparatus 200 of FIG. 2 or by a similar apparatus. For example, in some implementations the control system 204 of FIG. 2 may be configured to perform, at least in part, the operations that are described herein with reference to FIG. 3A. In some examples, the apparatus may be a mobile device, such as a cellular telephone. However, in other examples, the apparatus may be another type of device, such as a tablet, a laptop, an automobile or component thereof, a door access control device, a wearable device, etc. As with other methods disclosed herein, the methods outlined in FIG. 3A may include more or fewer blocks than indicated. Moreover, the blocks of methods disclosed herein are not necessarily performed in the order indicated.

In this example, the method 300 begins with block 302. Block 302 may, for example, involve triggering the fingerprint sensor system of a device to conduct an A-line scan. According to some implementations, the A-line scan may be triggered when a finger is not placed on the fingerprint sensor system. Due to the absence of the finger, A-line data that more accurately represents a screen protector on an outside surface of the device may be determined. The device may detect when a finger is not present on the fingerprint sensor system through various mechanisms. For example, when no finger is present, ultrasonic waves transmitted by the fingerprint sensor system will either not be reflected back or will have different reflection patterns than when a finger is present. According to some implementations, the A-line scan may be triggered at periodic time intervals (e.g., hourly, daily, weekly, etc.) or when the device is in an inactive state.

In this example, block 304 involves determining whether any contaminants are present on the outside surface of the device. For example, a control system of the device may detect contaminants present on a display screen of the device or on the fingerprint sensor system of the device by analyzing reflected ultrasonic waves. For example, the control system may analyze signal patterns in the reflected ultrasonic waves, which may provide information about contaminants present on the surface of the device, such as grease, dust, or moisture, and corresponding levels (or amounts) of the detected contaminants. In some cases, a contaminant check process may be performed to ensure that the presence of any contaminants is below threshold levels, thereby helping ensure proper operation of the fingerprint sensor system and reliability of any subsequently obtained A-line data. In this example, if it is determined in block 304 that the contaminant check is not satisfied, method 300 may proceed to block 320, where method 300 ends. In this example, if it is determined in block 304 that the contaminant check is satisfied, method 300 may proceed to block 306.

In this example, block 306 involves obtaining A-line data corresponding to a screen protector on the outside surface of the device. For example, a control system may control the fingerprint sensor system to obtain A-line data corresponding to the screen protector by transmitting ultrasonic pulses through the display screen and analyzing the reflected signals. The fingerprint sensor system may collect the A-line data over a long time interval (e.g., tens of microseconds), allowing the fingerprint sensor system to detect reflections from different layers, including the screen protector. When ultrasonic waves encounter the screen protector, they may create distinct reflection patterns based on the thickness, composition, and acoustic properties of the screen protector. The fingerprint sensor system may detect these reflections over an extended sampling time, which may enable the device to capture A-line data that represents the screen protector and may be subsequently used to identify the screen protector. The extended sampling time may allow the capture of more detailed data about how the ultrasonic waves interact with the screen protector. By analyzing this data, deeper insights about the screen protector may be learned, such as material type (e.g., glass film, plastic film, etc.) and thickness.

According to some implementations, A-line data captured by the fingerprint sensor system may be represented and analyzed in various forms. In its raw state, A-line data may consist of time-domain signals captured over an extended interval (e.g., tens of microseconds) that contain information describing reflections from a screen protector. In some implementations, raw A-line data may be transformed to extract more meaningful features. For example, a Fourier transform may be applied to convert raw A-line data from the time-domain into the frequency domain. In another example, Discrete Cosine Transform (DCT) may be applied to compress the A-line data and identify the most significant frequency components. The DCT converts time-domain signals into frequency-domain coefficients, where each coefficient's magnitude indicates its importance. Significant frequency components have larger magnitudes, representing essential structural information in the signal. Less important components have smaller magnitudes and typically correspond to noise or minor details, allowing them to be discarded or reduced for effective compression. In yet another example, wavelet transforms may be applied to raw A-line data.

According to some implementations, when obtaining A-line data corresponding to the screen protector on the surface of the device, the control system may control the fingerprint sensor system to obtain multiple instances of A-line signals corresponding to the screen protector by performing repeated ultrasonic measurements at different locations or under varying conditions. These multiple instances can differ due to slight variations in sensor positioning or acoustic coupling between the sensor and the screen protector. Additionally, environmental factors such as temperature fluctuations or small variations in material thickness and uniformity across different areas of the screen protector can cause measurable differences among the repeated A-line signals. Capturing multiple instances helps average out noise, identify consistent acoustic properties, reliably characterize the screen protector's thickness, and detect material properties and the presence of other layers or air gaps. In some implementations, the multiple instances of A-line signals may be combined to detect and identify screen protectors more accurately. For example, the multiple instances of A-line signals may be combined based on signal averaging, feature-level fusion, time-frequency analysis, or machine learning models trained to combine multiple A-line signals.

In this example, block 308 involves detecting a screen protector change. In various implementations, a screen protector change may be detected based on whether the obtained A-line data corresponding to the screen protector on the surface of the device matches stored A-line data corresponding to a screen protector previously detected on the outside surface of the device. For example, the stored A-line data may have previously been obtained from the screen protector previously applied to the outside surface of the device. In this example, if it is determined in block 308 that the obtained A-line data matches the stored A-line data, method 300 may proceed to block 310. In various implementations, a match, or threshold similarity, between two instances of A-line data may be determined through various signal processing techniques, such as cross-correlation, Euclidean distance, magnitude comparison, phase comparison, coherence, or frequency component analysis, to name some examples. In this example, the match between the obtained A-line data and the stored A-line data indicates that the screen protector corresponding to the obtained A-line data is the same as the screen protector corresponding to the stored A-line data. In other words, the match indicates the screen protector that was previously detected and registered is still being used. In this example, block 310 involves applying one or more stored configuration parameters associated with the stored A-line data to configure the fingerprint sensor system. The stored configuration parameters may be retrieved from the memory of the device.

In this example, if it is determined in block 308 that the obtained A-line data does not match the stored A-line data, method 300 may proceed to block 312. In this example, the mismatch between the obtained A-line data and the stored A-line data indicates that the screen protector corresponding to the obtained A-line data is different from the screen protector corresponding to the stored A-line data. In other words, the mismatch indicates the screen protector that was previously detected and registered has been replaced with a different screen protector.

In this example, block 312 involves obtaining configuration parameters for the fingerprint sensor system based on the obtained A-line data. For example, the configuration parameters may correspond to one or more transmission (Tx) and/or reception (Rx) parameters associated with the fingerprint sensor system 202. Some examples of Tx parameters that may be reconfigured include transmit frequency, transmit voltage amplitude, pulse duration, pulse repetition rate, and beamforming settings (such as the number and arrangement of active transmitting elements). Some examples of Rx parameters that may be reconfigured include receiver gain (sensitivity), sampling rate, range gate delays (time windows for capturing echoes), and filtering or equalization settings applied to the received signals. In some implementations, the configuration parameters are obtained from a dictionary (or similar data structure). The dictionary may be stored in the memory of the device. In some implementations, the dictionary maps respective A-line data associated with a plurality of screen protectors to one or more corresponding tuned (or optimized) configuration parameters that can be used to configure the fingerprint sensor system.

Figure 4:
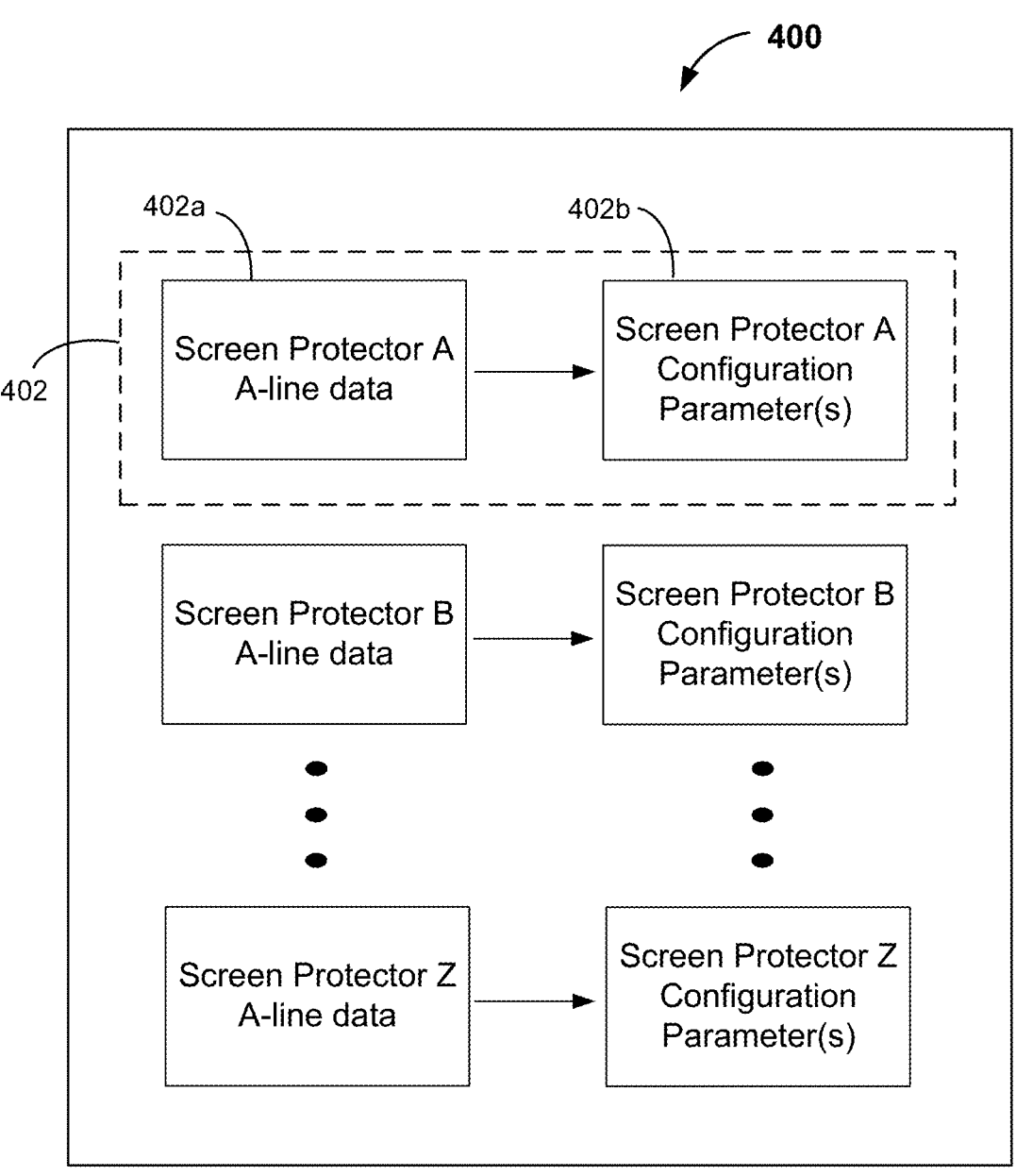
FIG. 4 shows a representation of an example dictionary.

For example, FIG. 4 shows a representation of an example dictionary 400. The dictionary 400 includes a number of key-value pairs with each pair corresponding to A-line data (or an A-line signature) representing a given screen protector and one or more configuration parameters associated with the A-line data. For example, the dictionary 400 includes an entry 402 corresponding to a screen protector named "Screen Protector A". The entry includes a key 402a representing A-line data corresponding to Screen Protector A and a mapped value 402b that corresponds to one or more configuration parameters tuned (or optimized) for Screen Protector A. In this example, Screen Protector A may correspond to a particular brand of screen protectors, a particular type of screen protector (e.g., glass, polyurethane, etc.), or based on some other distinguishing characteristic.

According to some implementations, configuration parameters may be tuned to configure the fingerprint sensor system to best (or optimally) capture fingerprint image data through a given screen protector. In the foregoing example, the configuration parameters 402b may be tuned to best capture fingerprint image data through Screen Protector A. In some implementations, configuration parameters may be tuned based on an offline tuning process that tests different configuration parameters to determine a combination of configuration parameters that provides the most accurate fingerprint recognition when a given screen protector is applied. Some examples of configuration parameters that may be tuned include frequency settings, operating modes (e.g., slow mode, fast mode), signal processing parameters, sensitivity settings, pulse characteristics, pressure output settings, and band-pass filter settings.

Some examples of Tx parameters that may be reconfigured include transmit frequency, transmit voltage amplitude, pulse duration, pulse repetition rate, and beamforming settings (such as the number and arrangement of active transmitting elements). Adjustments to Tx parameters may influence the characteristics of the transmitted ultrasonic waves. For example, higher transmit frequencies may provide finer resolution but less penetration depth, while lower frequencies may penetrate deeper but offer reduced detail. Increasing transmit voltage amplitude strengthens the emitted ultrasonic pulses, enhancing signal-to-noise ratio and improving detection of subtle reflections from screen protector interfaces. Modifying pulse duration or repetition rate affects signal clarity, penetration depth, and imaging speed. Beamforming adjustments allow precise control of ultrasonic beam directionality and spatial resolution, improving the sensor's ability to differentiate subtle variations in protector materials. In various embodiments, each of these Tx parameters can be tuned, either alone or in combination with Rx parameters, as part of an optimization process to discover respective parameter settings that provide the most accurate fingerprint recognition when a given screen protector is applied.

Some examples of Rx parameters that may be reconfigured include receiver gain (sensitivity), sampling rate, range gate delays (time windows for capturing echoes), and filtering or equalization settings applied to the received signals. Modifications to Rx parameters may affect how effectively reflected signals are captured and interpreted. For example, increasing receiver gain may enhance sensitivity to weaker echoes from thin adhesive layers or air gaps beneath screen protectors. Further, adjusting sampling rate may improve temporal resolution and accuracy in identifying depths. In some examples, modifying range gate delays may allow selective focus on specific interfaces or material layers, thus facilitating the measurement of corresponding properties. In another example, applying filtering or equalization may be used to emphasize particular frequency bands or suppress noise, thereby enabling clearer differentiation between different screen protector types based on acoustic impedance variations. In various embodiments, each of these Rx parameters can be tuned, either alone or in combination with Tx parameters, as part of an optimization process to discover respective parameter settings that provide the most accurate fingerprint recognition when a given screen protector is applied.

In some implementations, such configuration parameters may be tuned based on an online tuning process that tests different configuration parameters to determine a combination of configuration parameters that provides the most accurate fingerprint recognition when a given screen protector is applied to a device.

In some implementations, key-value pairs of A-line data and configuration parameters stored in the dictionary 400 may be organized into a number of bins that each correspond to a different temperature range. In general, temperature can significantly affect A-line data collection and operation of the fingerprint sensor system. For instance, temperature variations may cause thermal expansion or contraction of components of the fingerprint sensor system, thereby introducing errors in measurement accuracy. Thus, for example, A-line data corresponding to a screen protector, as captured when the ambient temperature corresponds to one temperature range, may vary from A-line data corresponding to the screen protector as captured when the ambient temperature corresponds to a different temperature range. To account for such discrepancies, the dictionary 400 may include multiple sets of A-line data and corresponding configuration parameters that have been tuned for different temperature ranges. In such implementations, when matching A-line data, a current ambient temperature associated with the device may be determined when A-line data is captured. In such implementations, a bin corresponding to a temperature range that includes the current ambient temperature may be identified. The bin may include a number of key-value pairs of A-line data and configuration parameters that are calibrated for the temperature range.

In this example, block 314 involves configuring the fingerprint sensor system based on the configuration parameters corresponding to the obtained A-line data. For example, the control system may control the fingerprint sensor system to modify one or more transmission (Tx) and/or reception (Rx) parameters associated with the fingerprint sensor system based on the configuration parameters associated with the obtained A-line data.

Some examples of Tx parameters that may be reconfigured include transmit frequency, transmit voltage amplitude, pulse duration, pulse repetition rate, and beamforming settings (such as the number and arrangement of active transmitting elements). Adjustments to Tx parameters may influence the characteristics of the transmitted ultrasonic waves. For example, higher transmit frequencies may provide finer resolution but less penetration depth, while lower frequencies may penetrate deeper but offer reduced detail. Increasing transmit voltage amplitude strengthens the emitted ultrasonic pulses, enhancing signal-to-noise ratio and improving detection of subtle reflections from screen protector interfaces. Modifying pulse duration or repetition rate affects signal clarity, penetration depth, and imaging speed. Beamforming adjustments allow precise control of ultrasonic beam directionality and spatial resolution, improving the sensor's ability to differentiate subtle variations in protector materials.

Some examples of Rx parameters that may be reconfigured include receiver gain (sensitivity), sampling rate, range gate delays (time windows for capturing echoes), and filtering or equalization settings applied to the received signals. Modifications to Rx parameters may affect how effectively reflected signals are captured and interpreted. For example, increasing receiver gain may enhance sensitivity to weaker echoes from thin adhesive layers or air gaps beneath screen protectors. Further, adjusting sampling rate may improve temporal resolution and accuracy in identifying depths. In some examples, modifying range gate delays may allow selective focus on specific interfaces or material layers to measure corresponding properties. In another example, applying filtering or equalization may be used to emphasize particular frequency bands or suppress noise, thereby enabling clearer differentiation between different screen protector types based on acoustic impedance variations. In various embodiments, each of these Rx parameters can be tuned, either alone or in combination with Tx parameters, as part of an optimization process to discover respective parameter settings that provide the most accurate fingerprint recognition when a given screen protector is applied.

In this example, block 316 involves updating the memory of the device to include the obtained A-line data. That is, any A-line data that was previously stored in the memory may be replaced with the obtained A-line data, which corresponds to the screen protector that was detected on the outside surface of the device. The A-line data stored in the memory may be subsequently used as a reference to determine whether a screen protector detected on the outside surface of the device is the same as the screen protector corresponding to the stored A-line data or whether the screen protector corresponding to the stored A-line data has been replaced by a different screen protector, as described in block 308.

In this example, block 318 optionally involves enrolling (or re-enrolling) a user of the device. For example, once configured based on the tuned configuration parameters, the fingerprint sensor system may more accurately capture fingerprint image data through the screen protector. That is, by enrolling (or re-enrolling) the user using the configured fingerprint sensor system, fingerprint image data that accounts for how fingerprints appear through the screen protector may be captured and stored. This fingerprint image data may be processed to extract unique features and create a new template that incorporates how fingerprints appear through that particular screen protector.

In some implementations, the control system may provide a graphical user interface through the display screen of the device that includes one or more options to initiate the enrollment process. The enrollment process may involve the user placing their finger multiple times on the fingerprint sensor system. The fingerprint sensor system may capture a high-resolution image of the user's fingerprint each time. These images may then be processed to extract the unique features and patterns of the fingerprint, such as the ridges, valleys, and minutiae points. The extracted features may be used to create a mathematical representation of the fingerprint (e.g., a fingerprint template), which is securely stored in memory on the device. During the enrollment phase, the user may be prompted to place their finger at slightly different angles or positions each time, allowing the system to capture a comprehensive map of the finger. Once the enrollment is complete, the stored fingerprint template may be used as a reference for comparison during future authentication attempts. In some implementations, the enrollment process may be adaptive. That is, once the user is initially enrolled, the adaptive enrollment process may involve continually refining the fingerprint template associated with the user with fingerprint image data that is captured during subsequent authentication attempts.

Figure 3B:
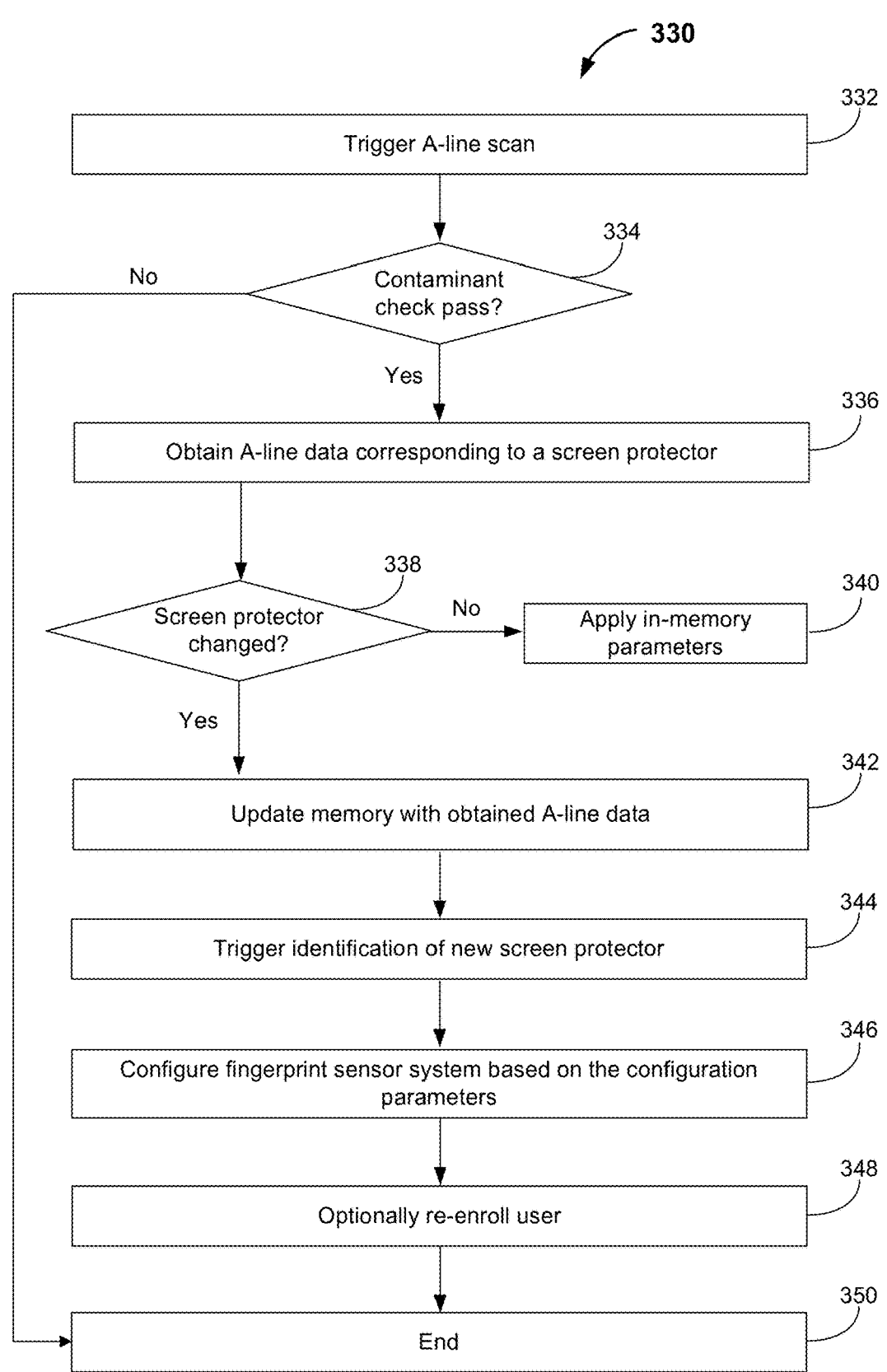
FIG. 3B is a flow diagram that presents examples of operations according to some disclosed methods.

FIG. 3B is a flow diagram that presents examples of operations according to some disclosed methods. The blocks of FIG. 3B may be performed by an apparatus that includes at least a fingerprint sensor system and a control system. The blocks of FIG. 3B may, for example, be performed by the apparatus 200 of FIG. 2 or by a similar apparatus. For example, in some implementations the control system 204 of FIG. 2 may be configured to perform, at least in part, the operations that are described herein with reference to FIG. 3B. In some examples, the apparatus may be a mobile device, such as a cellular telephone. However, in other examples, the apparatus may be another type of device, such as a tablet, a laptop, an automobile or component thereof, a door access control device, a wearable device, etc. As with other methods disclosed herein, the methods outlined in FIG. 3B may include more or fewer blocks than indicated. Moreover, the blocks of methods disclosed herein are not necessarily performed in the order indicated.

In this example, the method 330 begins with block 332. Block 332 may, for example, involve triggering the fingerprint sensor system of a device to conduct an A-line scan, as described in block 302 of FIG. 3A.

In this example, block 334 involves optionally determining whether any contaminants are present on the outside surface of the device, as described in block 304 of FIG. 3A. In this example, if it is determined in block 334 that the contaminant check is not satisfied, method 330 may proceed to block 348, where method 330 ends. In this example, if it is determined in block 334 that the contaminant check is satisfied, method 330 may proceed to block 336.

In this example, block 336 involves obtaining A-line data corresponding to a screen protector on the outside surface of the device, as described in block 306 of FIG. 3A.

In this example, block 338 involves detecting a screen protector change, as described in block 308 of FIG. 3A. In various implementations, a screen protector change may be detected based on whether the obtained A-line data corresponding to the screen protector on the surface of the device matches stored A-line data corresponding to a screen protector previously detected on the outside surface of the device or otherwise associated with the device. In this example, upon determining the screen protector is unchanged, method 330 may proceed to block 340, where one or more stored configuration parameters associated with the stored A-line data are applied to configure the fingerprint sensor system. In this example, upon determining the screen protector was changed, method 330 may proceed to block 342.

In this example, block 342 involves updating the memory of the device to store the obtained A-line data corresponding to the changed screen protector.

In this example, block 344 involves triggering the identification of the new screen protector. In some embodiments, various methods may be applied to determine configuration parameters for the new screen protector. For example, the configuration parameters may correspond to one or more transmission (Tx) and/or reception (Rx) parameters associated with the fingerprint sensor system 202. Some examples of Tx parameters that may be reconfigured include transmit frequency, transmit voltage amplitude, pulse duration, pulse repetition rate, and beamforming settings (such as the number and arrangement of active transmitting elements). Some examples of Rx parameters that may be reconfigured include receiver gain (sensitivity), sampling rate, range gate delays (time windows for capturing echoes), and filtering or equalization settings applied to the received signals. For example, depending on the implementation, configuration parameters for the new screen protector may be determined based on a differential sensing technique or parameter optimization technique.

In this example, block 346 involves configuring the fingerprint sensor system based on the configuration parameters corresponding to the obtained A-line data, as determined in block 348.

In this example, block 348 involves optionally involves enrolling (or re-enrolling) a user of the device, as described in block 318 of FIG. 3A. In this example, upon optionally re-enrolling the user, method 330 may proceed to block 350, where method 330 ends.

Figure 3C:
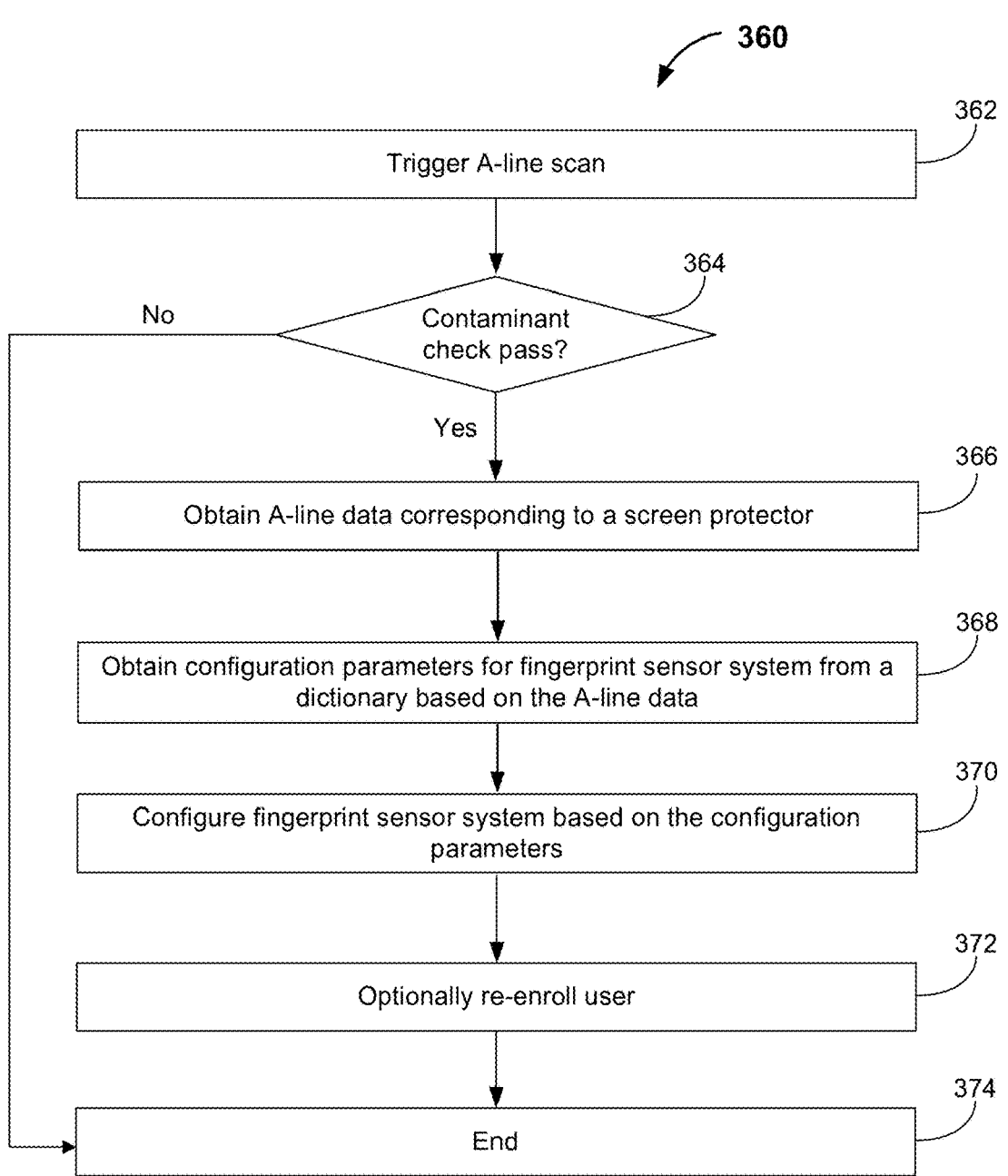
FIG. 3C is a flow diagram that presents examples of operations according to some disclosed methods.

FIG. 3C is a flow diagram that presents examples of operations according to some disclosed methods. The blocks of FIG. 3C may be performed by an apparatus that includes at least a fingerprint sensor system and a control system. The blocks of FIG. 3C may, for example, be performed by the apparatus 200 of FIG. 2 or by a similar apparatus. For example, in some implementations the control system 204 of FIG. 2 may be configured to perform, at least in part, the operations that are described herein with reference to FIG. 3C. In some examples, the apparatus may be a mobile device, such as a cellular telephone. However, in other examples, the apparatus may be another type of device, such as a tablet, a laptop, an automobile or component thereof, a door access control device, a wearable device, etc. As with other methods disclosed herein, the methods outlined in FIG. 3C may include more or fewer blocks than indicated. Moreover, the blocks of methods disclosed herein are not necessarily performed in the order indicated.

In this example, the method 360 begins with block 362. Block 362 may, for example, involve triggering the fingerprint sensor system of a device to conduct an A-line scan, as described in block 302 of FIG. 3A.

In this example, block 364 involves optionally determining whether any contaminants are present on the outside surface of the device, as described in block 304 of FIG. 3A. In this example, if it is determined in block 364 that the contaminant check is not satisfied, method 360 may proceed to block 374, where method 360 ends. In this example, if it is determined in block 364 that the contaminant check is satisfied, method 360 may proceed to block 366.

In this example, block 366 involves obtaining A-line data corresponding to a screen protector on the outside surface of the device, as described in block 306 of FIG. 3A.

In this example, block 368 involves obtaining configuration parameters for the fingerprint sensor system based on the obtained A-line data, as described in block 312 of FIG. 3A.

In this example, block 370 involves configuring the fingerprint sensor system based on the obtained configuration parameters, as described in block 314 of FIG. 3A.

In this example, block 372 involves optionally re-enrolling the user, as described in block 318 of FIG. 3A. In this example, upon optionally re-enrolling the user, method 360 may proceed to block 374, where method 360 ends.

FIG. 5 is a flow diagram that presents examples of operations according to some disclosed methods. The blocks of FIG. 5 may be performed by an apparatus that includes at least an ultrasonic fingerprint sensor system and a control system. The blocks of FIG. 5 may, for example, be performed by the apparatus 200 of FIG. 2 or by a similar apparatus. As with other methods disclosed herein, the methods outlined in FIG. 5 may include more or fewer blocks than indicated. Moreover, the blocks of methods disclosed herein are not necessarily performed in the order indicated. In some implementations, one or more blocks may be performed concurrently.

In this example, block 502 involves controlling an ultrasonic fingerprint sensor system to obtain current A-line data corresponding to a screen protector on an outside surface of an apparatus. The current A-line data may include sensor data corresponding to reflections of ultrasonic waves from the screen protector as detected by an ultrasonic receiver. According to some examples, the ultrasonic fingerprint sensor system is controlled to obtain the current A-line data upon detecting an absence of a user digit on the outside surface of the apparatus. According to some examples, the ultrasonic fingerprint sensor system is controlled to obtain the current A-line data at periodic time intervals.

In this example, block 504 involves obtaining at least one configuration parameter associated with the current A-line data corresponding to the screen protector. The at least one configuration parameter may be tuned to configure the ultrasonic fingerprint sensor system to capture fingerprint image data through the screen protector. According to some examples, the at least one configuration parameter associated with the current A-line data is obtained from a memory. According to some examples, the at least one configuration parameter associated with the current A-line data is obtained from a dictionary.

In this example, block 506 involves configuring the ultrasonic fingerprint sensor system based on the at least one configuration parameter associated with the current A-line data corresponding to the screen protector. According to some examples, configuring the ultrasonic fingerprint sensor system modifies at least one of a transmission parameter of the ultrasonic transmitter or a reception parameter of the ultrasonic receiver.

Figures 6A, 6B:
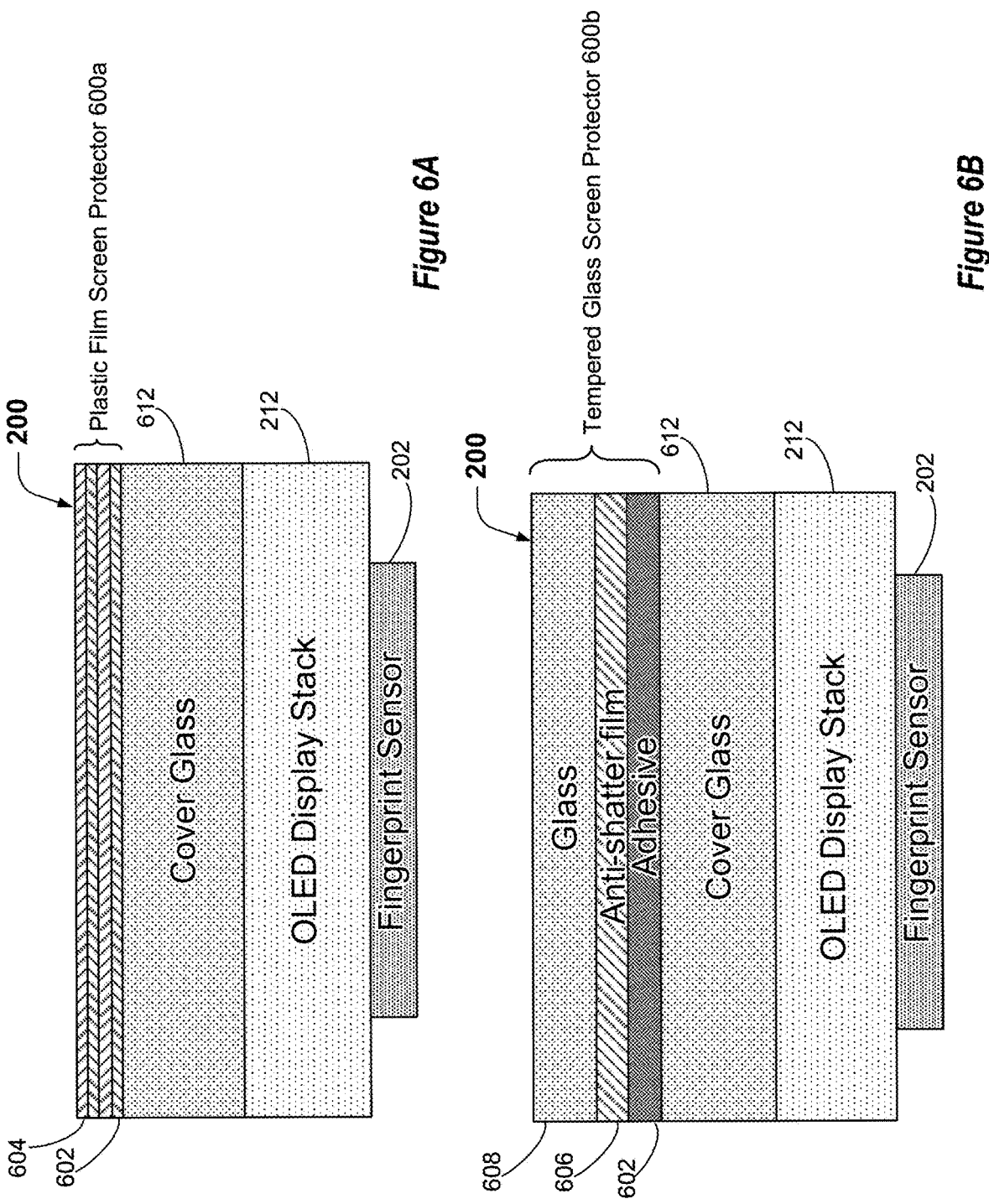
FIGS. 6A and 6B show examples of screen protectors residing on cover glasses of devices that include fingerprint sensors.

FIGS. 6A and 6B show examples of screen protectors residing on cover glasses of devices that include fingerprint sensors. In these examples, the illustrated fingerprint sensors are instances of the fingerprint sensor system 202 of apparatus 200, as shown in FIG. 2.

The plastic film screen protector 600a of FIG. 6A and the tempered glass screen protector 600b of FIG. 6B are examples of the "one or more layers" residing on a cover glass 612. The cover glass 612 may or may not actually be made of glass, depending on the particular implementation. The cover glass 612 may be formed of any appropriate material, such as glass, a hard plastic, etc. If the cover glass 612 overlies a display, the cover glass 612 is preferably formed of transparent material. The plastic film screen protector 600a includes alternating layers of adhesive 602 and plastic 604. The tempered glass screen protector 600b includes an adhesive layer 602, a glass layer 608 and an anti-shatter film disposed between the adhesive layer 602 and the glass layer 608.

Figure 6C:
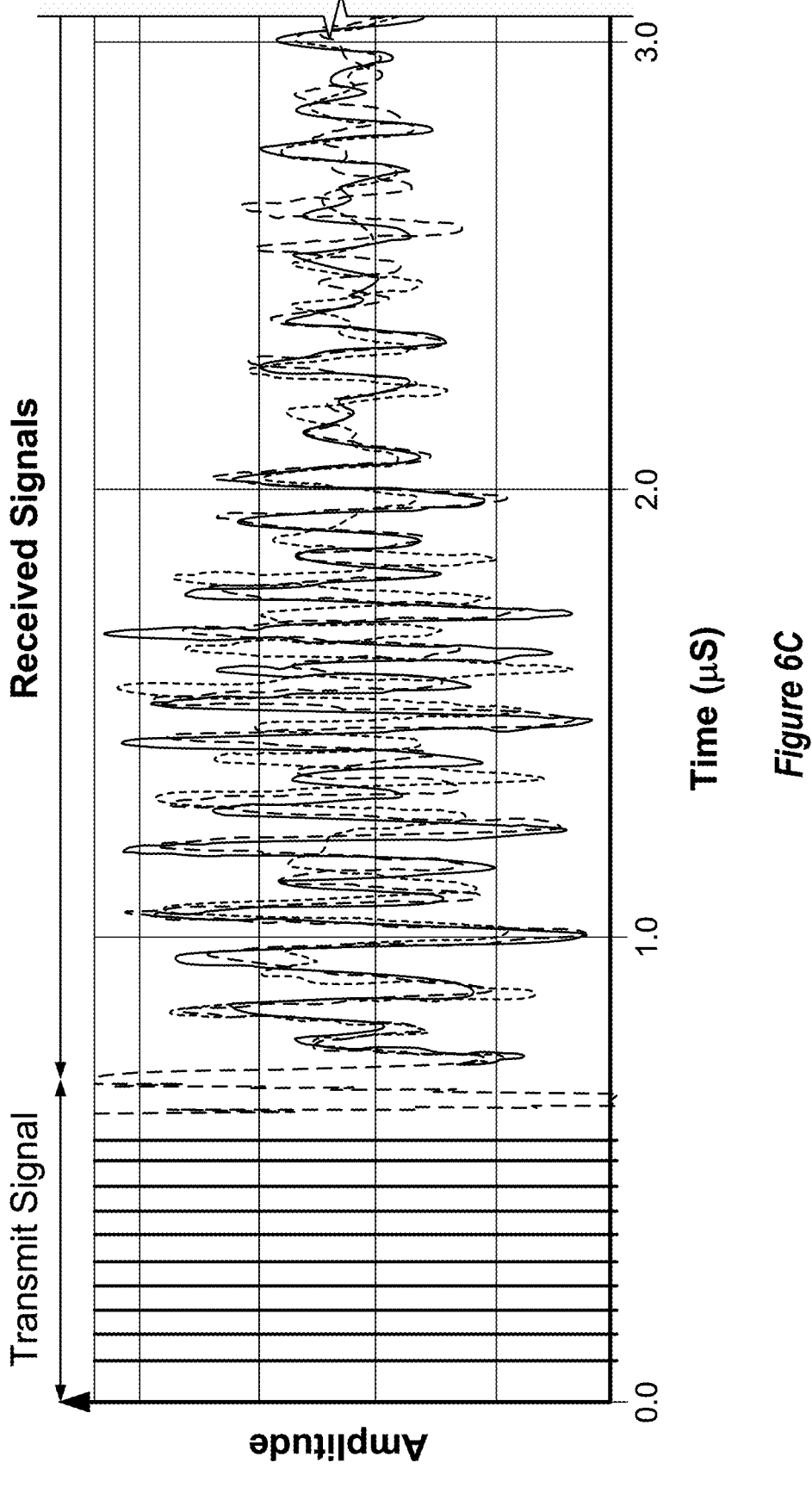
FIG. 6C shows three superimposed graphs of ultrasonic signals received via an electrode.
Figure 6C:
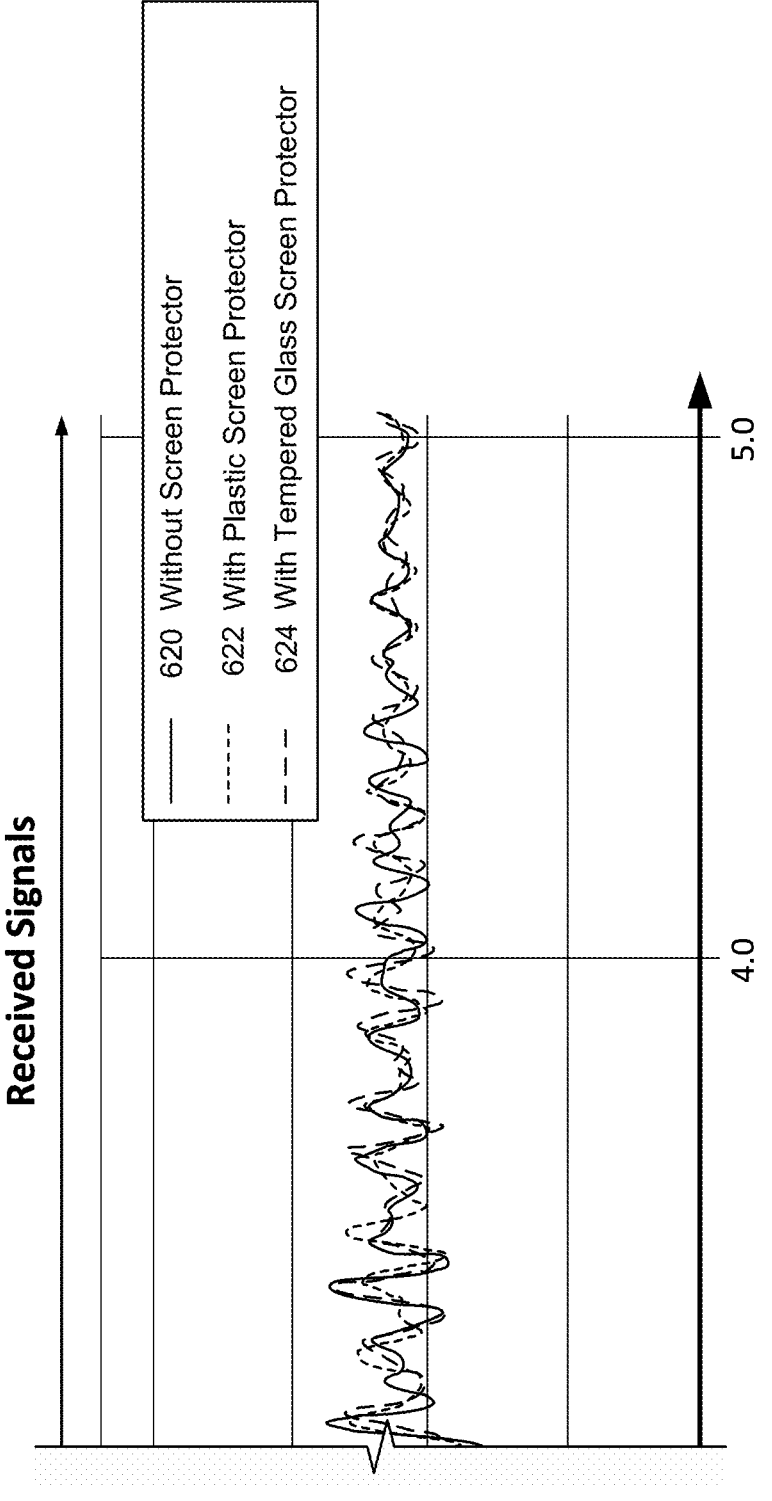

FIG. 6C shows three superimposed graphs of ultrasonic signals received via an electrode. In FIG. 6C, the dashed line 622 corresponds to ultrasonic signals received from a device having a plastic screen protector, such as the plastic film screen protector 600a of FIG. 6A, on its cover glass. In this example, the dashed line 624 corresponds to ultrasonic signals received from a device having a tempered glass screen protector, such as the tempered glass screen protector 600b of FIG. 6B, on its cover glass. In FIG. 6C, the solid line 620 corresponds to ultrasonic signals received from a device having no screen protector on its cover glass.

In FIG. 6C, the horizontal axis represents time in microseconds and the vertical axis represents signal amplitude. In this example, the graphs are scaled so that the received waveforms are clearly visible. As a consequence of this scaling, the transmit waveform was clipped because the amplitude of transmit waveform is very high compared to that of the received signals. In this example, the transmit signal includes five pulses at 9 MHz, with a gradual ramp up and ramp down of amplitude. In other examples, a transmit waveform may include between 0.5 and 20 pulses at single frequency, a chirp waveform that contains many frequencies, or another type of broadband waveform. According to some such examples, the frequencies may be in a range between 5 MHz and 20 MHz.

Even in the time domain representation that is shown in FIG. 6C, the signals received from the device with no screen protector may be distinguished from the signals received from the device with a plastic screen protector and from the signals received from the device with a tempered glass screen protector. As shown in FIG. 6C, the received waveforms have distinctive signal characteristics, including but not limited to amplitude information, phase information, etc., corresponding to properties of the "one or more layers" of the screen protectors. These signal characteristics may be analyzed and characterized to detect a screen protector and to distinguish one type of screen protector from another.

Figure 6D:
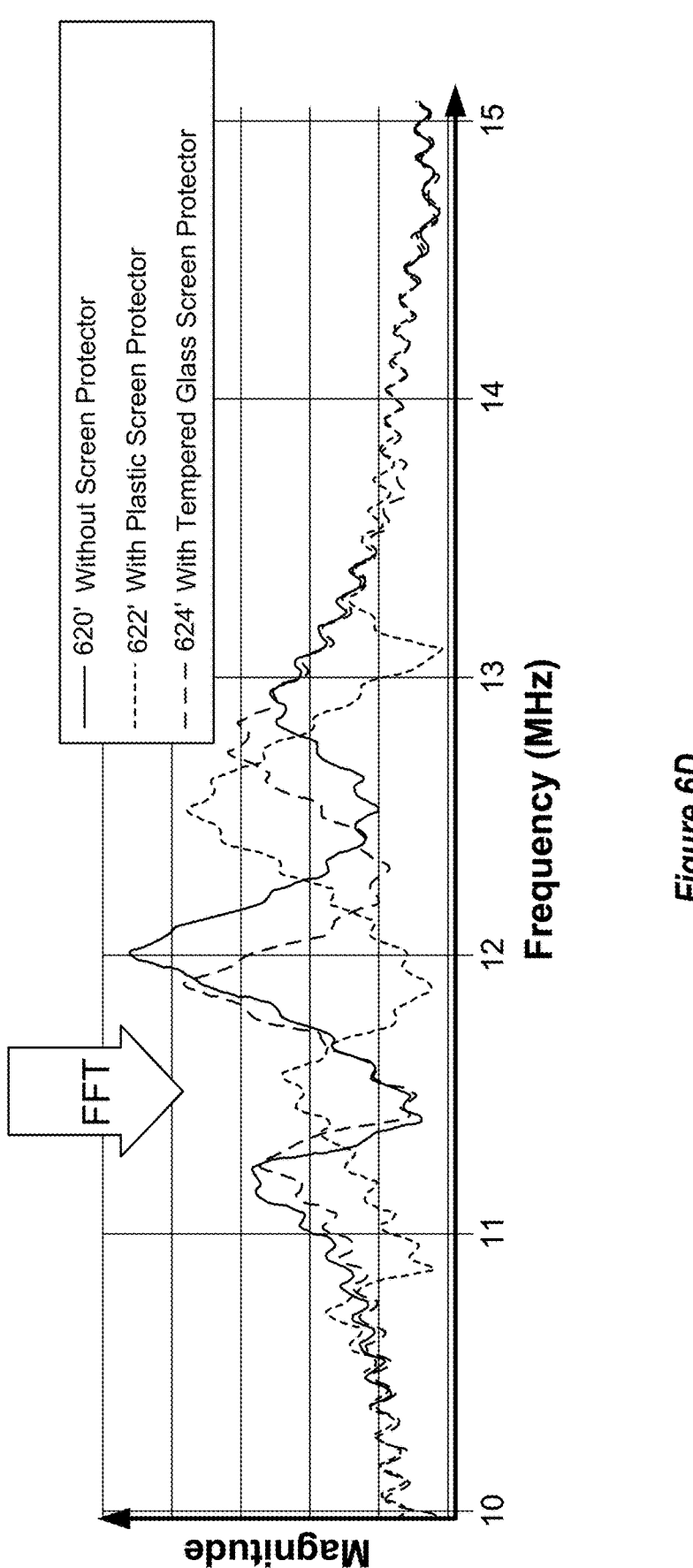
FIG. 6D shows frequency domain representations of the graphs shown in FIG. 6C.

FIG. 6D shows frequency domain representations of the graphs shown in FIG. 6C. In FIG. 6D, the dashed line 622' corresponds to a fast Fourier transform (FFT) of the time-domain ultrasonic signals 622 shown in FIG. 6C, the dashed line 624' corresponds to an FFT of the time-domain ultrasonic signals 622 shown in FIG. 6C and the solid line 620' corresponds to an FFT of the time-domain ultrasonic signals 620 shown in FIG. 6C.

It may be observed that the frequency domain representations of these graphs are readily distinguishable from one another, particularly in the frequency range between 10.6 MHz and 13.8 MHz. For example, at approximately 12 MHz the curve 620' (corresponding to the device with no screen protector) reaches its highest magnitude, whereas the curve 622' (corresponding to the device with a plastic screen protector) is at a much lower magnitude. At between 11.8 MHz and 11.9 MHz, the curve 624' (corresponding to the device with a tempered glass screen protector) reaches its highest magnitude, whereas the curve 622' reaches one of its lowest magnitudes. Accordingly, these signal characteristics may be analyzed and characterized to detect a screen protector and to distinguish one type of screen protector from another.

Implementation examples are described in the following numbered clauses:

Clause 1 An apparatus, comprising: an ultrasonic fingerprint sensor system including an ultrasonic transmitter and an ultrasonic receiver; and a control system configured for electrical communication with the ultrasonic fingerprint sensor system, the control system being further configured to: control the ultrasonic fingerprint sensor system to obtain current A-line data corresponding to a screen protector on an outside surface of the apparatus, the current A-line data comprising sensor data corresponding to reflections of ultrasonic waves from the screen protector as detected by the ultrasonic receiver; obtain at least one configuration parameter associated with the current A-line data corresponding to the screen protector, wherein the at least one configuration parameter is tuned to configure the ultrasonic fingerprint sensor system to capture fingerprint image data through the screen protector; and configure the ultrasonic fingerprint sensor system based on the at least one configuration parameter associated with the current A-line data corresponding to the screen protector.

Clause 2 The apparatus of clause 1, wherein the control system is configured to control the ultrasonic fingerprint sensor system to obtain the current A-line data upon detecting an absence of a user digit on the outside surface of the apparatus.

Clause 3 The apparatus of clause 1, wherein the control system is configured to control the ultrasonic fingerprint sensor system to obtain the current A-line data at periodic time intervals.

Clause 4 The apparatus of clause 1, wherein configuring the ultrasonic fingerprint sensor system modifies at least one of a transmission parameter of the ultrasonic transmitter or a reception parameter of the ultrasonic receiver.

Clause 5 The apparatus of clause 1 or clause 4, wherein the control system is configured to obtain the at least one configuration parameter associated with the current A-line data from a memory of the apparatus.

Clause 6 The apparatus of clauses 1, 4, or 5, wherein the at least one configuration parameter is obtained from the memory upon determining a match between the current A-line data and stored A-line data stored in the memory, wherein the stored A-line data corresponds to a screen protector previously detected on the outside surface of the apparatus.

Clause 7 The apparatus of clause 1 or clause 4, wherein the control system is configured to obtain the at least one configuration parameter associated with the current A-line data from a dictionary stored in a memory of the apparatus.

Clause 8 The apparatus of clauses 1, 4, or 7, wherein the dictionary maps respective A-line data associated with a plurality of screen protectors to one or more corresponding configuration parameters.

Clause 9 The apparatus of clauses 1, 4, 7, or 8, wherein the dictionary includes a plurality of bins corresponding to different temperature ranges, and wherein each bin includes mappings between A-line data associated with a plurality of screen protectors and one or more corresponding configuration parameters calibrated for a temperature range associated with the bin.

Clause 10 The apparatus of clauses 1-9, wherein, upon configuring the ultrasonic fingerprint sensor system based on the at least one configuration parameter, the control system is further configured to provide a graphical user interface through a display screen of the apparatus, wherein the graphical user interface provides one or more options to initiate an enrollment process.

Clause 11 A method, comprising: controlling, by a control system, an ultrasonic fingerprint sensor system to obtain current A-line data corresponding to a screen protector on an outside surface of an apparatus, the current A-line data comprising sensor data corresponding to reflections of ultrasonic waves from the screen protector as detected by an ultrasonic receiver; obtaining, by the control system, at least one configuration parameter associated with the current A-line data corresponding to the screen protector, wherein the at least one configuration parameter is tuned to configure the ultrasonic fingerprint sensor system to capture fingerprint image data through the screen protector; and configuring, by the control system, the ultrasonic fingerprint sensor system based on the at least one configuration parameter associated with the current A-line data corresponding to the screen protector.

Clause 12 The method of clause 11, wherein the control system is configured to control the ultrasonic fingerprint sensor system to obtain the current A-line data upon detecting an absence of a user digit on the outside surface of the apparatus.

Clause 13 The method of clause 11, wherein the control system is configured to control the ultrasonic fingerprint sensor system to obtain the current A-line data at periodic time intervals.

Clause 14 The method of clause 11, wherein configuring the ultrasonic fingerprint sensor system modifies at least one of a transmission parameter of an ultrasonic transmitter or a reception parameter of the ultrasonic receiver.

Clause 15 The method of clause 11 or clause 14, wherein the control system is configured to obtain the at least one configuration parameter associated with the current A-line data from a memory of the apparatus.

Clause 16 One or more non-transitory media having instructions stored thereon for controlling a device to perform a method, the method comprising: controlling, by a control system, an ultrasonic fingerprint sensor system to obtain current A-line data corresponding to a screen protector on an outside surface of the device, the current A-line data comprising sensor data corresponding to reflections of ultrasonic waves from the screen protector as detected by an ultrasonic receiver; determining, by the control system, a screen protector change based at least in part on a mismatch between the current A-line data corresponding to the screen protector on the outside surface of the apparatus and stored A-line data corresponding to a screen protector previously detected on the outside surface of the apparatus; storing, by the control system, the current A-line data corresponding to the screen protector and at least one configuration parameter associated with the current A-line data corresponding to the screen protector, wherein the at least one configuration parameter is tuned to configure the ultrasonic fingerprint sensor system to capture fingerprint image data through the screen protector; and configuring, by the control system, the ultrasonic fingerprint sensor system based on the at least one configuration parameter associated with the current A-line data corresponding to the screen protector.

Clause 17 The one or more non-transitory media of clause 16, wherein the control system is configured to control the ultrasonic fingerprint sensor system to obtain the current A-line data upon detecting an absence of a user digit on the outside surface of the device.

Clause 18 The one or more non-transitory media of clause 16, wherein the control system is configured to control the ultrasonic fingerprint sensor system to obtain the current A-line data at periodic time intervals.

Clause 19 The one or more non-transitory media of clause 16, wherein configuring the ultrasonic fingerprint sensor system modifies at least one of a transmission parameter of an ultrasonic transmitter or a reception parameter of the ultrasonic receiver.

Clause 20 The one or more non-transitory media of clause 16 or clause 19, wherein the control system is configured to obtain the at least one configuration parameter associated with the current A-line data from a memory of the device.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
an ultrasonic fingerprint sensor system including an ultrasonic transmitter and an ultrasonic receiver; and
a control system configured for electrical communication with the ultrasonic fingerprint sensor system, the control system being further configured to:
control the ultrasonic fingerprint sensor system to obtain current A-line data corresponding to a screen protector on an outside surface of the apparatus, the current A-line data comprising sensor data corresponding to reflections of ultrasonic waves from the screen protector as detected by the ultrasonic receiver;
obtain at least one configuration parameter associated with the current A-line data corresponding to the screen protector, wherein the at least one configuration parameter is tuned to configure the ultrasonic fingerprint sensor system to capture fingerprint image data through the screen protector; and
configure the ultrasonic fingerprint sensor system based on the at least one configuration parameter associated with the current A-line data corresponding to the screen protector.

2. The apparatus of claim 1, wherein the control system is configured to control the ultrasonic fingerprint sensor system to obtain the current A-line data upon detecting an absence of a user digit on the outside surface of the apparatus.

3. The apparatus of claim 1, wherein the control system is configured to control the ultrasonic fingerprint sensor system to obtain the current A-line data at periodic time intervals.

4. The apparatus of claim 1, wherein configuring the ultrasonic fingerprint sensor system modifies at least one of a transmission parameter of the ultrasonic transmitter or a reception parameter of the ultrasonic receiver.

5. The apparatus of claim 1, wherein the control system is configured to obtain the at least one configuration parameter associated with the current A-line data from a memory of the apparatus.

6. The apparatus of claim 5, wherein the at least one configuration parameter is obtained from the memory upon determining a match between the current A-line data and stored A-line data stored in the memory, wherein the stored A-line data corresponds to a screen protector previously detected on the outside surface of the apparatus.

7. The apparatus of claim 1, wherein the control system is configured to obtain the at least one configuration parameter associated with the current A-line data from a dictionary stored in a memory of the apparatus.

8. The apparatus of claim 7, wherein the dictionary maps respective A-line data associated with a plurality of screen protectors to one or more corresponding configuration parameters.

9. The apparatus of claim 8, wherein the dictionary includes a plurality of bins corresponding to different temperature ranges, and wherein each bin includes mappings between A-line data associated with a plurality of screen protectors and one or more corresponding configuration parameters calibrated for a temperature range associated with the bin.

10. The apparatus of claim 1, wherein, upon configuring the ultrasonic fingerprint sensor system based on the at least one configuration parameter, the control system is further configured to provide a graphical user interface through a display screen of the apparatus, wherein the graphical user interface provides one or more options to initiate an enrollment process.

11. A method, comprising:
controlling, by a control system, an ultrasonic fingerprint sensor system to obtain current A-line data corresponding to a screen protector on an outside surface of an apparatus, the current A-line data comprising sensor data corresponding to reflections of ultrasonic waves from the screen protector as detected by an ultrasonic receiver;
obtaining, by the control system, at least one configuration parameter associated with the current A-line data corresponding to the screen protector, wherein the at least one configuration parameter is tuned to configure the ultrasonic fingerprint sensor system to capture fingerprint image data through the screen protector; and
configuring, by the control system, the ultrasonic fingerprint sensor system based on the at least one configuration parameter associated with the current A-line data corresponding to the screen protector.

12. The method of claim 11, wherein the control system is configured to control the ultrasonic fingerprint sensor system to obtain the current A-line data upon detecting an absence of a user digit on the outside surface of the apparatus.

13. The method of claim 11, wherein the control system is configured to control the ultrasonic fingerprint sensor system to obtain the current A-line data at periodic time intervals.

14. The method of claim 11, wherein configuring the ultrasonic fingerprint sensor system modifies at least one of a transmission parameter of an ultrasonic transmitter or a reception parameter of the ultrasonic receiver.

15. The method of claim 11, wherein the control system is configured to obtain the at least one configuration parameter associated with the current A-line data from a memory of the apparatus.

16. One or more non-transitory media having instructions stored thereon for controlling a device to perform a method, the method comprising:

controlling, by a control system, an ultrasonic fingerprint sensor system to obtain current A-line data corresponding to a screen protector on an outside surface of the device, the current A-line data comprising sensor data corresponding to reflections of ultrasonic waves from the screen protector as detected by an ultrasonic receiver;

determining, by the control system, a screen protector change based at least in part on a mismatch between the current A-line data corresponding to the screen protector on the outside surface of the device and stored A-line data corresponding to a screen protector previously detected on the outside surface of the device;

storing, by the control system, the current A-line data corresponding to the screen protector and at least one configuration parameter associated with the current A-line data corresponding to the screen protector, wherein the at least one configuration parameter is tuned to configure the ultrasonic fingerprint sensor system to capture fingerprint image data through the screen protector; and configuring, by the control system, the ultrasonic fingerprint sensor system based on the at least one configuration parameter associated with the current A-line data corresponding to the screen protector.

17. The one or more non-transitory media of claim 16, wherein the control system is configured to control the ultrasonic fingerprint sensor system to obtain the current A-line data upon detecting an absence of a user digit on the outside surface of the device.

18. The one or more non-transitory media of claim 16, wherein the control system is configured to control the ultrasonic fingerprint sensor system to obtain the current A-line data at periodic time intervals.

19. The one or more non-transitory media of claim 16, wherein configuring the ultrasonic fingerprint sensor system modifies at least one of a transmission parameter of an ultrasonic transmitter or a reception parameter of the ultrasonic receiver.

20. The one or more non-transitory media of claim 16, wherein the control system is configured to obtain the at least one configuration parameter associated with the current A-line data from a memory of the device.

* * * * *